(12) United States Patent
Aliani et al.

(10) Patent No.: US 7,634,279 B1
(45) Date of Patent: Dec. 15, 2009

(54) SYSTEM AND METHOD FOR PARTIALLY TIME-BASED ALLOCATION OF VOCODER RESOURCES

(75) Inventors: Maqbool Aliani, Fairfax, VA (US); Ismael Garcia, Leesburg, VA (US); Ante Kovacevic, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 586 days.

(21) Appl. No.: 11/345,179

(22) Filed: Jan. 31, 2006

(51) Int. Cl.
*H04Q 7/20* (2006.01)
(52) U.S. Cl. .................. 455/453; 455/452.1; 455/452.2; 370/321; 370/356
(58) Field of Classification Search .................. 455/34.1, 455/54.1; 370/331, 332, 330; 375/224, 200
See application file for complete search history.

(56) References Cited

U.S. PATENT DOCUMENTS

| | | | | |
|---|---|---|---|---|
| 5,239,678 A | * | 8/1993 | Grube et al. ................. | 455/511 |
| 5,857,147 A | * | 1/1999 | Gardner et al. ........... | 455/67.11 |
| 5,898,730 A | * | 4/1999 | Hensley et al. .............. | 375/224 |
| 2005/0124348 A1 | * | 6/2005 | Gaal et al. ................... | 455/450 |

* cited by examiner

*Primary Examiner*—Patrick N. Edouard
*Assistant Examiner*—Julio Perez (57) ABSTRACT

A system and method for allocating vocoder resources for interconnect calls includes consideration of whether an interconnect call request occurs during a known period of heightened network activity. In an embodiment a vocoder type is assigned to a given interconnect call based on a comparison of the available capacity of the telecommunications network to one or more threshold values, and a determination on whether or not the telecommunications network is in a predefined high activity or usage period. In certain embodiments, the vocoder is adapted to operate in one of two possible types, where the first type is characterized by a higher voice quality, but a lower network capacity, than the second type.

35 Claims, 5 Drawing Sheets

PRIOR ART

SYSTEM AND METHOD FOR PARTIALLY TIME-BASED ALLOCATION OF VOCODER RESOURCES

FIELD OF THE INVENTION

The present invention relates generally to the field of telecommunications, and in particular, to improving the management and allocation of voice encoder/decoder (vocoder) resources.

BACKGROUND OF THE INVENTION

In providing cellular telephone services, telecommunications providers are generally interested in providing the highest quality of service while still maximizing the capacity of the network. Sometimes these are competing objectives. With respect to network capacity, cellular network operators desire to maximize network system capacity. Higher network capacity results in less rejections of call requests and, in-turn, increased customer satisfaction. Therefore, it is desirable to increase network capacity.

In providing the highest quality of service, high rate voice coding or vocoding is the technology behind most modern voice compression techniques and has been utilized to improve voice quality for cellular calls. As is known, a vocoder converts the spoken words of the caller into a digital signal and then reconverts the signal into an audible sound so that the words can be heard by the intended recipient. These high rate vocoders provide good voice quality however, in general, these high coding/decoding rates utilize more network capacity than lower rate vocoders.

A vocoder is typically a computer algorithm or program which operates on a digitized voice signal generated by an Analog-to-Digital converter. The vocoder algorithm first encodes a voice signal by processing it in varying ways in order to represent it with some small number of bits. A vocoder also contains a decoding function which is able to reconstruct the voice waveform from these bits. Many different vocoder algorithms have been developed which employ different types of processing and depending on the method of processing, some algorithms perform considerable better or worse than others. Vocoder performance is generally measured in terms of compression rate (i.e. how few bits are required to represent the voice signal) plus the voice quality (i.e. how much distortion does the encoding/decoding process introduce into the reconstructed voice signal). Additional performance factors include the complexity of the algorithm, in terms of the amount of computing power required to run the algorithm, and its robustness to factors such as background noise and bit errors which are often present in the real world. Due to these differences, selection of the best vocoder is one of the larger challenges faced by the network designer.

One relatively new vocoding method is the AMBE® Vocoder developed by Digital Voice System, Inc. of Burlington, Mass. The AMBE® class of vocoders require roughly half the bandwidth of earlier vocoders, such as the Vector Sum Excited Linear Prediction (VSELP) method. Moreover, these modern vocoders have the ability to interleave several calls onto a single channel at a given frequency. Such vocoders can also be operated to interleave more or fewer calls onto a given channel, depending on the available bandwidth and desired call quality. For example, such vocoders have the ability to be assigned to a call as a so-called full 3:1 call or a split 3:1 call, where a full 3:1 call will be interleaved with two other calls onto a single channel and a split 3:1 call will be interleaved with five other calls for a total of six call on a single channel. There is, however, a trade off in that the more calls that are interleaved onto a channel, the lower the call quality will be. That is, increasing network capacity to handle additional calls by implementing split 3:1 encoding tends to result in a corresponding decrease in call quality. The problem lies in identifying the optimum conditions under which split 3:1 encoding should be used so as to maintain as high a call quality as possible, while providing increased network capacity. Determining these conditions has proved to be a difficult task. Thus, despite the recent advancements in vocoding technology, there is still a need for optimizing vocoder resource allocation.

SUMMARY OF THE INVENTION

A system and method for allocation of vocoder resources is disclosed herein. In an embodiment, a method of the invention includes receiving a request to transport an interconnect call over a telecommunications network, determining if an available network capacity of the telecommunications network is greater than a threshold value, and determining if the request is during a high activity period of the telecommunications network. In addition, the method includes assigning a vocoder type to the interconnect call based on whether the available network capacity is greater than the threshold value and on whether the request is during the high activity period.

Other aspects, features, and techniques of the invention will be apparent to one skilled in the relevant art in view of the following detailed description of the invention.

DETAILED DESCRIPTION OF THE EXEMPLARY EMBODIMENTS

Systems and method for allocating vocoder resources are disclosed. One aspect of the invention is to assign a vocoder type to an interconnect call transported over a telecommunications network. In certain embodiments, the vocoder type to be assigned is based on a comparison of the available capacity of the telecommunications network to one or more threshold values, and on whether or not the telecommunications network is in a high activity or usage period. In certain embodiments, the vocoder is adapted to operate in one of at least two possible types, where the first type is characterized by a higher voice quality, but a lower network capacity, than the second type.

In one or more embodiments, the higher voice quality vocoder type may be assigned to an interconnect call when the available network capacity is greater than the threshold value(s). In certain circumstances, the higher voice quality type may be assigned to the interconnect call even if the available network capacity is not greater than the threshold value(s), such as for example when the interconnect call is not being made during a high network activity period. Alternatively, if the available network capacity is not greater than the threshold value, and the interconnect call is being made during a high activity period, then the second vocoder type may be assigned to the interconnect call.

In certain embodiments, the second vocoder type may be associated with interleaving a higher number of voice calls onto a single radio frequency channel of the telecommunications network than with the first vocoder type. For example, the second vocoder type may be associated with interleaving six calls onto a single radio frequency channel, while the first vocoder type may involve interleaving only three call onto a single channel.

Another aspect of the invention is to compare the available network capacity of a telecommunications network to a threshold value which is comprised of at least one of a congestion relief threshold and a split threshold. In certain embodiments, the congestion relief threshold may be indicative of how readily congestion relief measures are to be undertaken by the telecommunications network, while the split threshold may be indicative of how readily the second vocoder type is to be assigned to the interconnect call in question. In one embodiment, the threshold value may be based on the sum of the congestion relief threshold and the split threshold.

Figure 1:
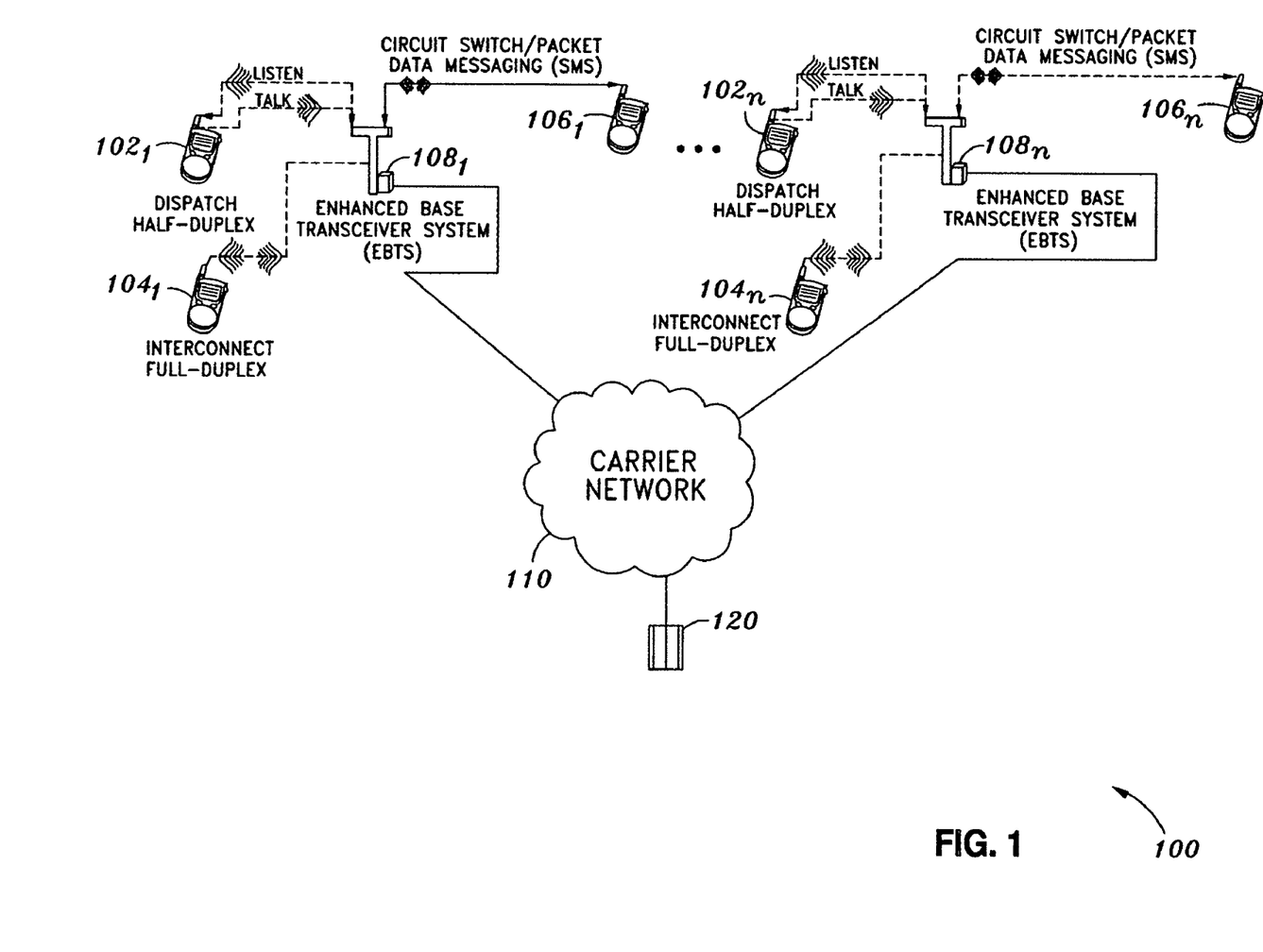
FIG. 1 illustrates an embodiment of a communication system capable of implementing one or more aspects of the invention.

Referring now to the figures, FIG. 1 illustrates a block diagram of an exemplary telecommunications communication system 100 in which one or more aspects of the invention may be implemented. In certain embodiments, the communication system 100 is an iDEN system, such as the iDEN network owned and operated by Nextel Communications Inc. of Reston, Va. However, the telecommunication network of FIG. 1 may similarly be a Global System for Mobile (GSM) network, Code Division Multiple Access (CDMA) network, a Time Division Multiple Access (TDMA) network, or a Public Switched Telephone Network (PSTN). As shown in FIG. 1, the communication system 100 may serve a plurality of dispatch subscriber units $102_1$-$102_n$, a plurality of interconnect subscriber units $104_1$-$104_n$, and a plurality of SMS subscriber units $106_1$-$106_n$ (collectively, "subscriber units 102-106"), all of which may communicate with a plurality of local base stations $108_1$-$108_n$. While the embodiment described herein is an iDEN network, it is readily understood that other known networks may be used; such as CDMA, GSM, etc. The subscriber units are the end-user interface to the communication network 100. It should be appreciated that subscriber units 102-106 may be comprised of phones, pagers, modems, mobile transceivers, personal digital assistants, end-user base transceivers, or similar devices capable of communicating over the carrier network 110. Subscriber units 102-106 may be capable of dispatch calling, interconnect calling, roaming, message mail and/or data communications. In addition, said subscribers will preferably be capable of using multiple vocoding/encoding types.

Figure 2:
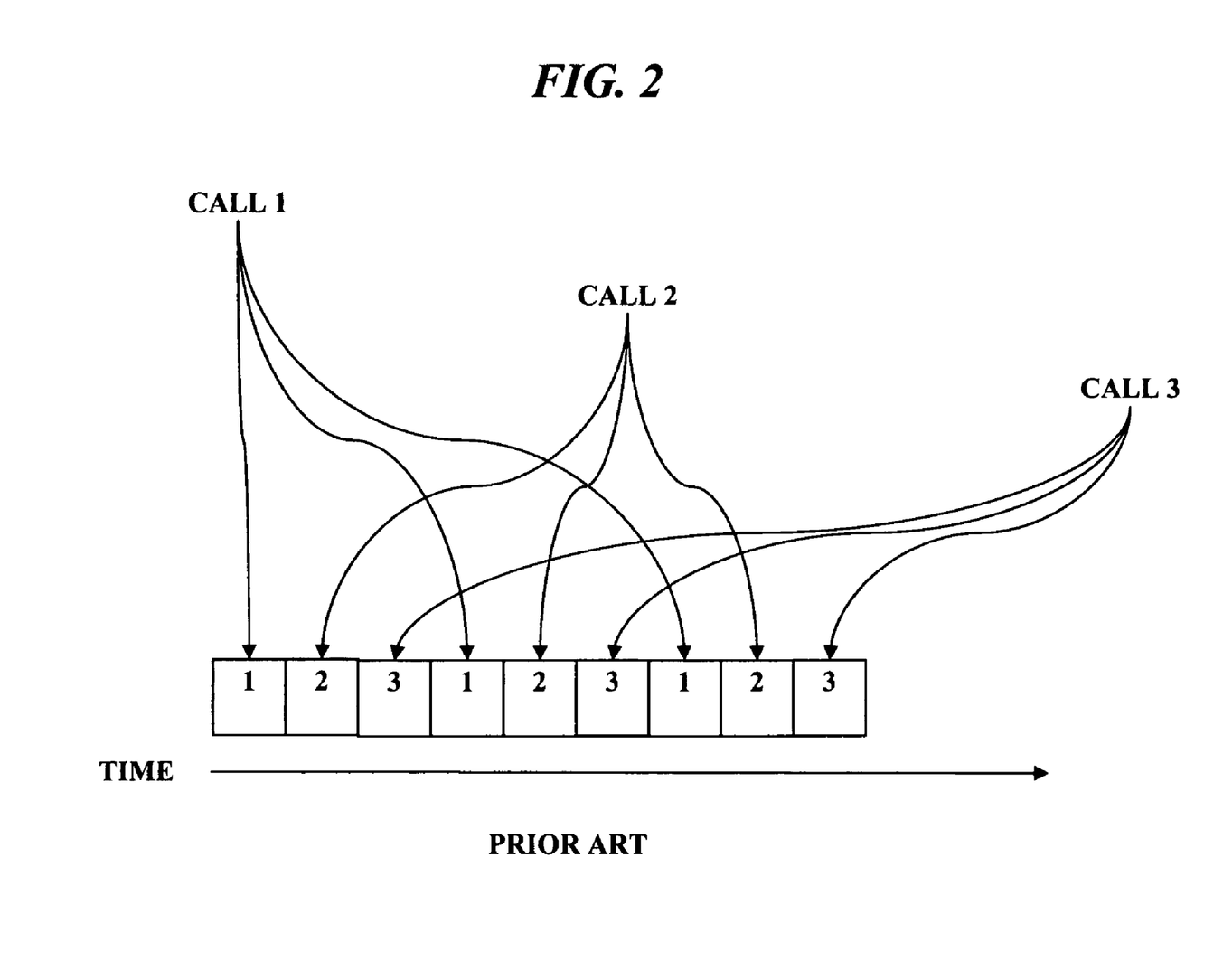
FIG. 2 illustrates an interleaved communication channel of the prior art.

Base stations $108_1$-$108_n$ may be comprised of base station radios and control equipment contained in an Enhanced Base Transceiver System (EBTS), or cell site. Such cell sites may be used to provide the RF link between the carrier network 110 and the various subscriber units 102-106. Cell sites may further provide connectively between subscriber units 102-106 and an external network 112. Wireless communication between base stations $108_1$-$108_n$ and subscriber units 102-106 occurs via encoded radio frequency (RF) channels which provide physical paths over which digital communication signals such as voice and data are transmitted. As is generally known in the art, communication channels between the base stations $108_1$-$108_n$ and subscriber units 102-106 may be encoded by a transcoder using a vocoder algorithm (e.g., AMBE®, VSELP, etc.). Vocoders generally operate by modeling a segment (or frame) of the speech waveform on the order of 15-20 ms. The speech model parameters are estimated, quantized, coded, and transmitted over the communication channel. At the receiver, the transmitted values are decoded, reconstructed, and used to synthesize speech. To increase network capacity, vocoders have the ability to encode data from several callers onto the same channel frequency. For example, a vocoders can interleave calls from either 3 or 6 users onto a single channel whereby each user transmits and receives only during an assigned time slot interval. To that end, FIG. 2 depicts an exemplary interconnect channel comprised of 9 time slots spanning 15-20 ms. Three different callers each have been assigned a unique time slot designation. This vocoder type is typically referred to as full 3:1 service—meaning that a user is allocated every third time slot on a single frequency channel, thereby interleaving caller time slots for a given channel and increasing channel capacity. While FIG. 2 depicts 9 time slots, interconnect channels in iDEN networks may be comprised of 6 time slots.

Figure 3:
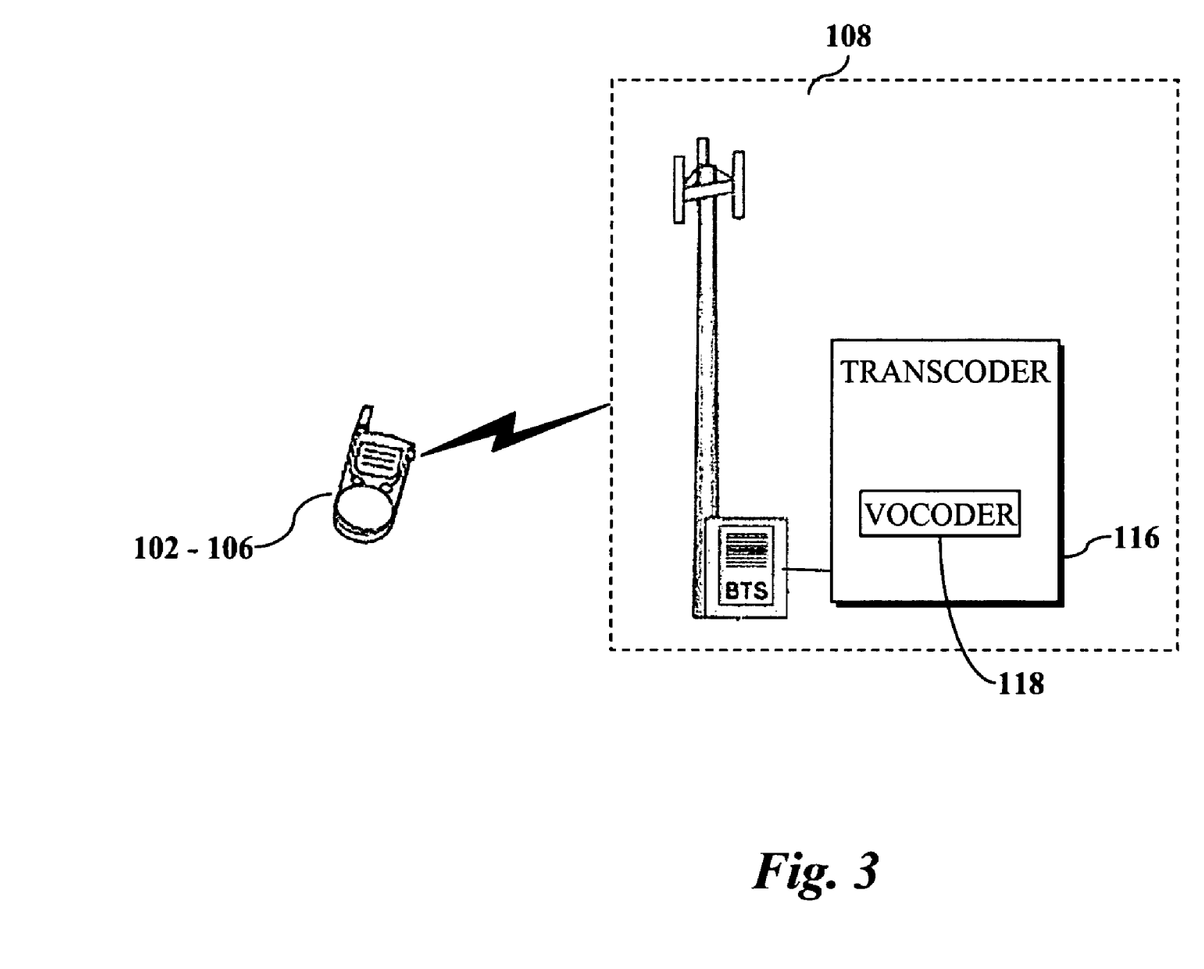
FIG. 3 illustrates one embodiment of a base station in communication with a subscriber unit in accordance with the principles of the present invention

FIG. 3 illustrates a simplified representation of the interaction between a base station 108 and a subscriber unit 102-106 in accordance with the principles of the invention. In this embodiment, the base station is shown as being in communication with a transcoder 116. It should be appreciated that the transcoder 116 may be located locally to the base station 108 or remotely. For example, it should be appreciated that the transcoder 116 may be part of a central office that is in communication with a plurality of base stations $108_1$-$108_n$. The transcoder 116 includes a vocoder module 118 which encodes/decodes voice data sent to and from the base station 108 over one or more available RF channels. In certain embodiments, the base station 108 will separate the voice data into a predetermined number of time slots where the predetermined number of time slots is based on the current encoding type of the vocoder module 118. In certain embodiments, vocoder 118 may allocate channel slots on either a full 3:1 type or a split 3:1 type, where a split 3:1 type allows six callers to share a single channel rather than just three callers as in the case of the full 3:1 type depicted in FIG. 2.

While operating in the split 3:1 type increases network capacity, there is a corresponding decrease in call quality. Thus, the decision whether to operate in full or split 3:1 type by a base station's vocoder allocation manager may be made by comparing available resources to one or more threshold parameters. Currently, each time there is a new interconnect call, the allocation of vocoder resources is determined by comparing a value representative of the available bandwidth ("available_ic_capacity") to the sum of a congestion relief threshold ("crThreshold") and a split threshold ("SplitThreshold"). If the available_ic_capacity is less than or equal to the sum of the available_ic_capacity plus the crThreshold, then the vocoder enters the split 3:1 type in which a channel is shared by six caller. Otherwise, full 3:1 type may be used.

The available_ic_capacity value typically represents the networks capacity on a market basis, local network basis, cell site, etc. The crThreshold value is used to determine how soon congestion relief call offloading will commence. That is, the higher the crThreshold value, the sooner congestion relief measures will begin. The crThreshold value is based on numerous market-level factors that are beyond the scope of this disclosure. Similarly, the SplitThreshold value involves consideration of a multitude of factors, including average call blocking, number of available carriers, customer satisfaction rates, etc. Ultimately, the SplitThreshold value is a representation of how quickly calls should be allocated to split 3:1 service. That is, the higher the SplitThreshold value, the more calls will be split 3:1 calls. Similarly, the higher the crThreshold value, the greater the amount of calls that will be offloaded from a network resource, such as an EBTS, and the more calls that will be allocated as split 3:1 calls.

Figure 4:
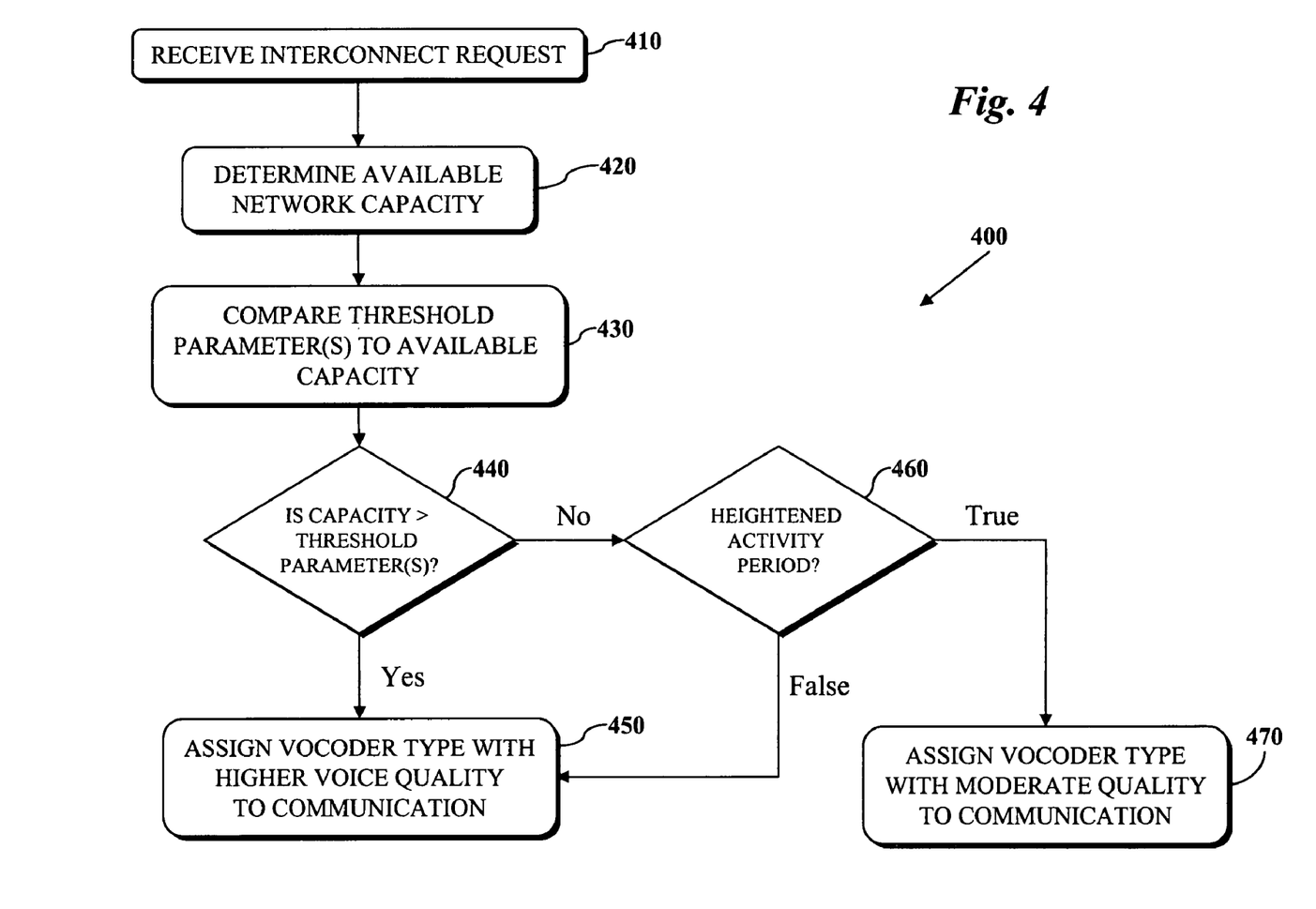
FIG. 4 illustrates one embodiment of a process for carrying out certain aspects of the invention.

While the aforementioned approach improves vocoder resource management, solely comparing crThreshold values and SplitThreshold values to the available_ic_capacity value may lead to inconsistent management of calls across base station cells. This is due to the fact that localized conditions cannot be taken into account when these parameters are set at the global market level from the Operation and Maintenance Center (OMC), as they typically are. That is, the SplitThreshold and crThreshold parameters are typically determined by balancing a multitude of factors each of which may or may not be applicable to a given cell site. Alternatively, setting the vocoder type parameters on a per cell basis would represent a daunting task requiring a large of amount of resources. The end result is that even optimized threshold values can lead to unnecessarily poor voice quality during high capacity/low usage times. Thus, one aspect of the invention is to improve the allocation of vocoder resources by also taking into account known high-activity times for the communication network. To that end, FIG. 4 illustrates one embodiment of a process for allocating vocoder resources in accordance with the principles of the invention.

Process 400 begins at block 410 where an interconnect request is received from a user (e.g., subscriber unit 102-106) by a cell tower (e.g., base station 108). A determination may then be made as to what the available network capacity is for that cell tower, where the capacity may be represented as a value (e.g., available_ic_capacity) indicative of the cell tower's available RF bandwidth. At block 430, the capacity then may be compared to one or more threshold parameters. In certain embodiments, such parameter(s) may include a congestion relief threshold (e.g., crThreshold) and/or a split threshold value (e.g., SplitThreshold), where the congestion relief threshold governs how quickly congestion control measures are taken, and the split threshold value governs how quickly calls are allocated as split 3:1 calls. In certain other embodiments, the one or more threshold parameters may simply be representative of how quickly a vocoder (e.g., vocoder 118) enters a higher capacity type characterized by moderate voice quality rather than operating in a lower capacity type characterized by higher voice quality.

Once the comparison of block 430 is done, a determination may then be made at block 440 as to whether the available capacity is greater than the threshold parameter(s). If the available capacity is greater than the threshold parameter(s), then the vocoder type for the incoming interconnect call may be assigned to the higher quality type at block 450 (e.g., full 3:1 type). If, on the other hand, the available capacity is less than or equal to the threshold parameter(s) then process 400 will continue to block 460 where a determination is made as to whether the interconnect call is being made during a heightened activity period. In certain embodiments, this may be accomplished by designating predetermined periods of time as heightened activity periods and assigning a variable a "true" value during such times. For example, the variable TIME_BIAS may bet set to "true" during the known peak usage hours of between 7:00-9:00 am and between 4:00-7:00 pm. Outside of these times, TIME_BIAS would be set to 'false.' In another embodiment, an available capacity that is equal to the threshold parameter(s) may still cause the process to move to block 450 and assign the incoming call to the higher voice quality.

It should equally be appreciated that numerous other approaches may be used to determine if the interconnect request is occurring during a heightened activity period. Heightened activity periods, or peak hours, can be applied geographically by the network based on local time for each different geographic area, and associated time zone, serviced by the network. The present invention is not limited to how peak utilization periods are determined or designated. For example, as illustrated above, peak periods may be determined and designated by particular periods of the day which historically have been associated with high network utilization periods. Alternatively, peak periods could be determined and designated by calculating network capacity utilization rates. All that is required is that a peak utilization period(s) of the network be determined and that a vocoder rate that is less than optimal for the conditions associated with the voice communication, e.g., background noise, RF channel conditions, etc., is utilized during the peak utilization period(s) of the telecommunications network, regardless of how the period(s) is determined or designated.

Continuing to refer to FIG. 4, if in fact it is determined at block 460 that the interconnect request is occurring during a heightened activity period (e.g., TIME_BIAS=True), then process 400 will move to block 470 where the vocoder type for the incoming interconnect call will be assigned to a moderate quality type (e.g., split 3:1 type). If, on the other hand, the interconnect request is not occurring during a heightened activity period, then process 400 will move to block 450 where the vocoder type will be assigned to a higher quality type (e.g., full 3:1 type).

Figure 5:
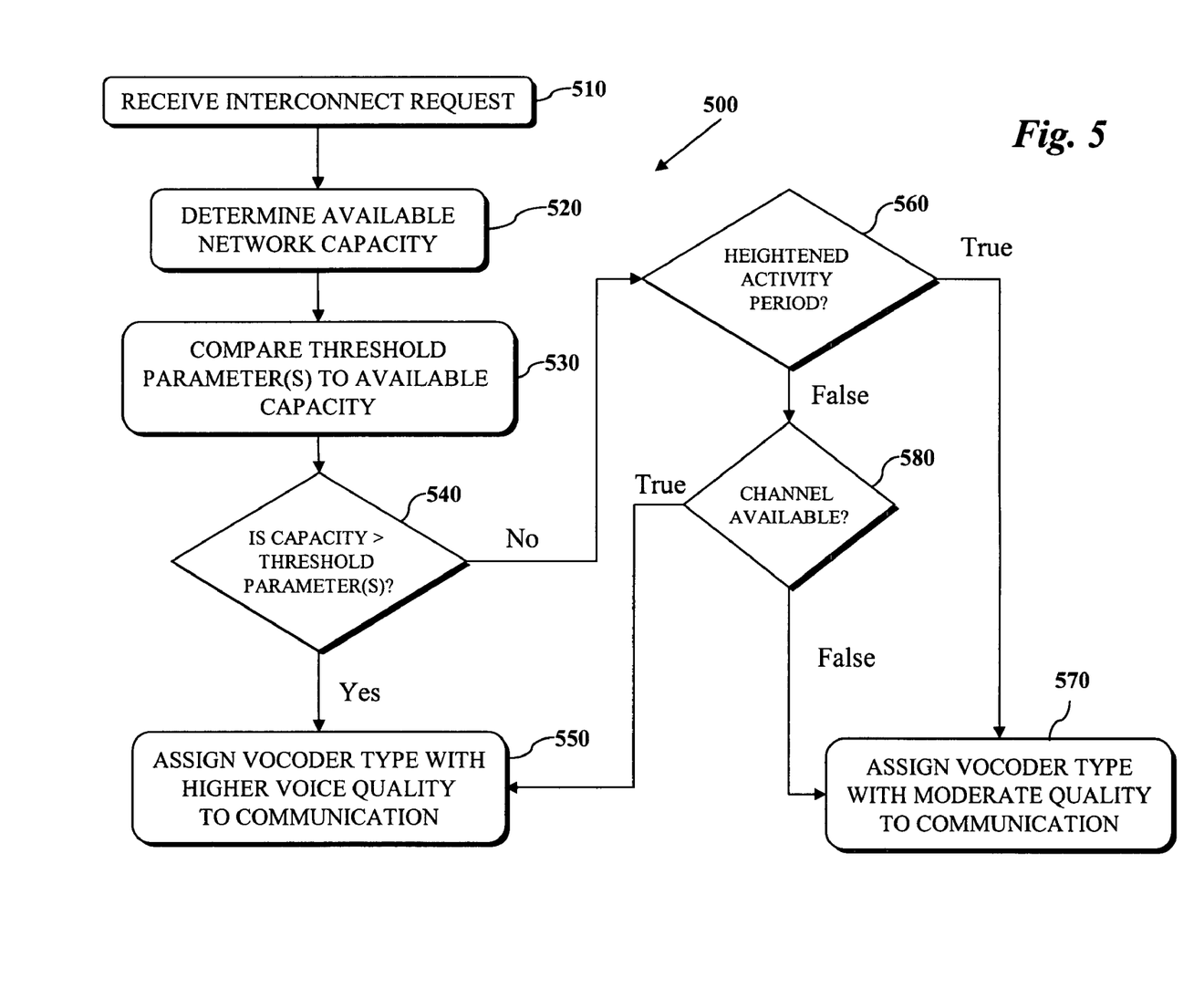
FIG. 5 illustrates another embodiment of a process for carrying out certain aspects of the invention.

In this fashion, better voice quality may be achieved during off-peak hours of network utilization where resources otherwise permit. However, it is possible that even during off peak hours there may not be an available channel for the incoming interconnect call. For such cases, the process 500 of FIG. 5 may be used. In particular, process 500 begins at block 510 where an interconnect request is received from a user by a cell tower, as with the process 400 of FIG. 4. Once the available network capacity is determined at block 520, it can be compared to the one or more threshold parameters at block 530, just as in the embodiment of FIG. 4. If it is determined at block 540 that the available capacity is still greater than the threshold parameter(s), then the vocoder type for the incoming interconnect call will be assigned to a higher quality type at block 550. If, on the other hand, the available capacity is less than or equal to the threshold parameter(s), then process 500 will continue to block 560 where a determination may then be made as to whether the interconnect call is occurring during a heightened activity period. If so, then process 500 will move to block 570 where the vocoder type for the incoming interconnect call will be assigned to a moderate quality type. If, on the other hand, the interconnect request is not occurring during a heightened activity period, then process 500 may then continue to block 580 where a further determination can be made as to whether there are any available channels to handle the incoming request. If so, then process 500 will continue to block 550 where the vocoder type will be assigned to the higher quality type. If there are no available channels, the process 500 moves to block 570 where the vocoder type is assigned to the moderate quality type. It should further be appreciated that other measures may be undertaken to accommodate the new interconnect request when there are no available channels (e.g., congestion control offloading). While the present disclosure has been principally directed to describing the management of two vocoder types, it should equally be appreciated that the invention may be implemented using more than two vocoder types.

The disclosed embodiments are illustrative of the various ways in which the present invention may be practiced. Other embodiments can be implemented by those skilled in the art without departing from the spirit and scope of the present invention. For example, while the processes of FIGS. 4-5 have been described in the above embodiments, the order of one or more of the acts depicted in FIGS. 4-5 may be changed while still conforming to the principles of the invention. For the sake of simplicity, the processes of FIGS. 4-5 have been defined in general steps and it should be appreciated that other steps consistent with the principles of the invention may be included.

What is claimed is:

1. A method for assigning a vocoder type to an interconnect call transported over a telecommunications network, comprising the acts of:
receiving a request to transport the interconnect call;
determining if an available network capacity of the telecommunications network is greater than a threshold value;
determining if said request is during a predetermined high activity period of said telecommunications network;
assigning the vocoder type to the interconnect call based on whether the available network capacity is greater than the threshold value and on whether the request is during the predetermined high activity period, wherein assigning the vocoder type comprises assigning one of at least a first vocoder type and a second vocoder type, wherein said first vocoder type provides a higher voice quality for the interconnect call than the second vocoder type; and
connecting the interconnect call following said assigning of the vocoder type, wherein said threshold value comprises at least one of a congestion relief threshold and a split threshold, wherein said congestion relief threshold is indicative of how readily congestion relief measures are to be undertaken by the telecommunications network, and said split threshold is indicative of how readily said second vocoder type is to be assigned.

2. The method of claim 1 wherein if the available network capacity is greater than the threshold value, the first vocoder type is assigned to the interconnect call.

3. The method of claim 1 wherein if the available network capacity is not greater than the threshold value, and the request is not during the predetermined high activity period, the first vocoder type is assigned to the interconnect call.

4. The method of claim 3 wherein said first vocoder type is assigned to the interconnect call only if there is an available channel of said telecommunications network.

5. The method of claim 1 wherein if the available network capacity is not greater than the threshold value, and the request is during the predetermined high activity period, the second vocoder type is assigned to the interconnect call.

6. The method of claim 1 wherein said second vocoder type is associated with interleaving a higher number of voice calls onto a single radio frequency channel of the telecommunications network, and said first vocoder type is associated with interleaving a lower number of voice calls onto the single radio frequency channel.

7. The method of claim 6 wherein said higher number of voice calls is six and said lower number of voice calls is three.

8. The method of claim 1 wherein a capacity of the telecommunications network for supporting subscribers is increased as a result of utilizing the second vocoder type.

9. The method of claim 1 wherein said threshold value is based on the sum of the congestion relief threshold and the split threshold.

10. The method of claim 1, wherein assigning the vocoder type comprises assigning the vocoder type to the interconnect call for the duration of the interconnect call.

11. The method of claim 1, wherein the predetermined high activity period is based, at least in part, on historical network usage information for particular periods of time.

12. A system for increasing capacity in a telecommunications network, comprising:
a vocoder adapted to operate in one of at least a first vocoder type and a second vocoder type based on whether an available network capacity of the telecommunications network is greater than a threshold value, and on whether an interconnect call is received during a predetermined high activity period of the telecommunications network, wherein said threshold value comprises at least one of a congestion relief threshold and a split threshold, wherein said congestion relief threshold is indicative of how readily congestion relief measures are to be undertaken by the telecommunications network, and said split threshold is indicative of how readily said second vocoder type is to be assigned, and
wherein the system is further adapted to connect the interconnect call following a determination of which one of the at least first vocoder type and second vocoder type is to be used for said interconnect call.

13. The system of claim 12 wherein said first vocoder type provides a higher voice quality for the interconnect call than the second vocoder type.

14. The system of claim 13 wherein if the available network capacity is greater than the threshold value, the first vocoder type is assigned to the interconnect call.

15. The system of claim 13 wherein if the available network capacity is not greater than the threshold value, and the interconnect call is not received during the predetermined high activity period, the first vocoder type is assigned to the interconnect call.

16. The system of claim 15 wherein said first vocoder type is assigned to the interconnect call only if there is an available channel of said telecommunications network.

17. The system of claim 13 wherein if the available network capacity is not greater than the threshold value, and the interconnect call is received during the predetermined high activity period, the second vocoder type is assigned to the interconnect call.

18. The system of claim 13 wherein said second vocoder type is associated with interleaving a higher number of voice calls onto a single radio frequency channel of the telecommunications network, and said first vocoder type is associated with interleaving a lower number of voice calls onto the single radio frequency channel.

19. The system of claim 18 wherein said higher number of voice calls is six and said lower number of voice calls is three.

20. The system of claim 13 wherein a capacity of the telecommunications network for supporting subscribers is increased as a result of utilizing the second vocoder type.

21. The system of claim 12 wherein said threshold value is based on the sum of the congestion relief threshold and the split threshold.

22. The system of claim 12, wherein the determined one of the at least first vocoder type and second vocoder type is to be used for the duration of said interconnect call.

23. The system of claim 12, wherein the predetermined high activity period is based, at least in part, on historical network usage information for particular periods of time.

24. A method for increasing capacity of a telecommunications network, comprising the acts of:

comparing an available network capacity of the telecommunications network to a threshold value;

determining if the telecommunications network is in a predetermined high activity period;

selecting one of at least a first vocoder type and a second vocoder type based on said comparing and said determining, wherein said first vocoder type provides a higher voice quality and lower network capacity than the second vocoder type; and connecting the interconnect call following selecting said one of the at least first vocoder type and second vocoder type, wherein said threshold value comprises at least one of a congestion relief threshold and a split threshold, wherein said congestion relief threshold is indicative of how readily congestion relief measures are to be undertaken by the telecommunications network, and said split threshold is indicative of how readily said second vocoder type is to be selected.

25. The method of claim 24 wherein if the available network capacity is greater than the threshold value, the first vocoder type is selected.

26. The method of claim 24 wherein if the available network capacity is less than the threshold value, and the telecommunications network is not in the predetermined high activity period, the first vocoder type is selected.

27. The method of claim 24 wherein said first vocoder type is selected only if there is an available channel of said telecommunications network.

28. The method of claim 24 wherein if the available network capacity is less than the threshold value, and the telecommunications network is in the predetermined high activity period, the second vocoder type is selected.

29. The method of claim 24 wherein if the available network capacity is equal to the threshold value, said selecting comprises selected the first vocoder type if the telecommunications network is in the predetermined high activity period and selecting the second vocoder type if the telecommunications network is not in the predetermined high activity period.

30. The method of claim 24 wherein if the available network capacity is equal to the threshold value, said selecting comprises selecting the first vocoder type.

31. The method of claim 24 wherein said second vocoder type is associated with interleaving a higher number of voice calls onto a single radio frequency channel of the telecommunications network, and said first vocoder type is associated with interleaving a lower number of voice calls onto the single radio frequency channel.

32. The method of claim 31 wherein said higher number of voice calls is six and said lower number of voice calls is three.

33. The method of claim 24 wherein said threshold value is based on the sum of the congestion relief threshold and the split threshold.

34. The method of claim 24, wherein selecting the one of at least the first and second vocoder type comprises selecting one of at least the first vocoder type and the second vocoder type for the duration of the interconnect call.

35. The method of claim 24, wherein the predetermined high activity period is based, at least in part, on historical network usage information for particular periods of time.

* * * * *